Figure 1:
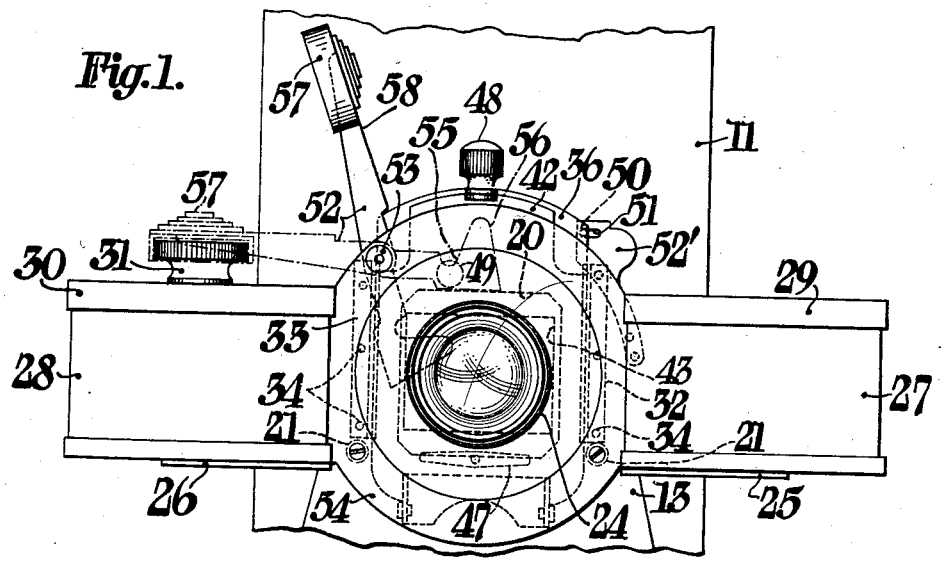

Sept. 5, 1939.  A. NAGEL  2,172,256
PROJECTION APPARATUS
Filed May 13, 1937  2 Sheets-Sheet 1

August Nagel,
INVENTOR:
BY Newton M. Perkins
George A. Gillett, Jr.
ATTORNEYS.

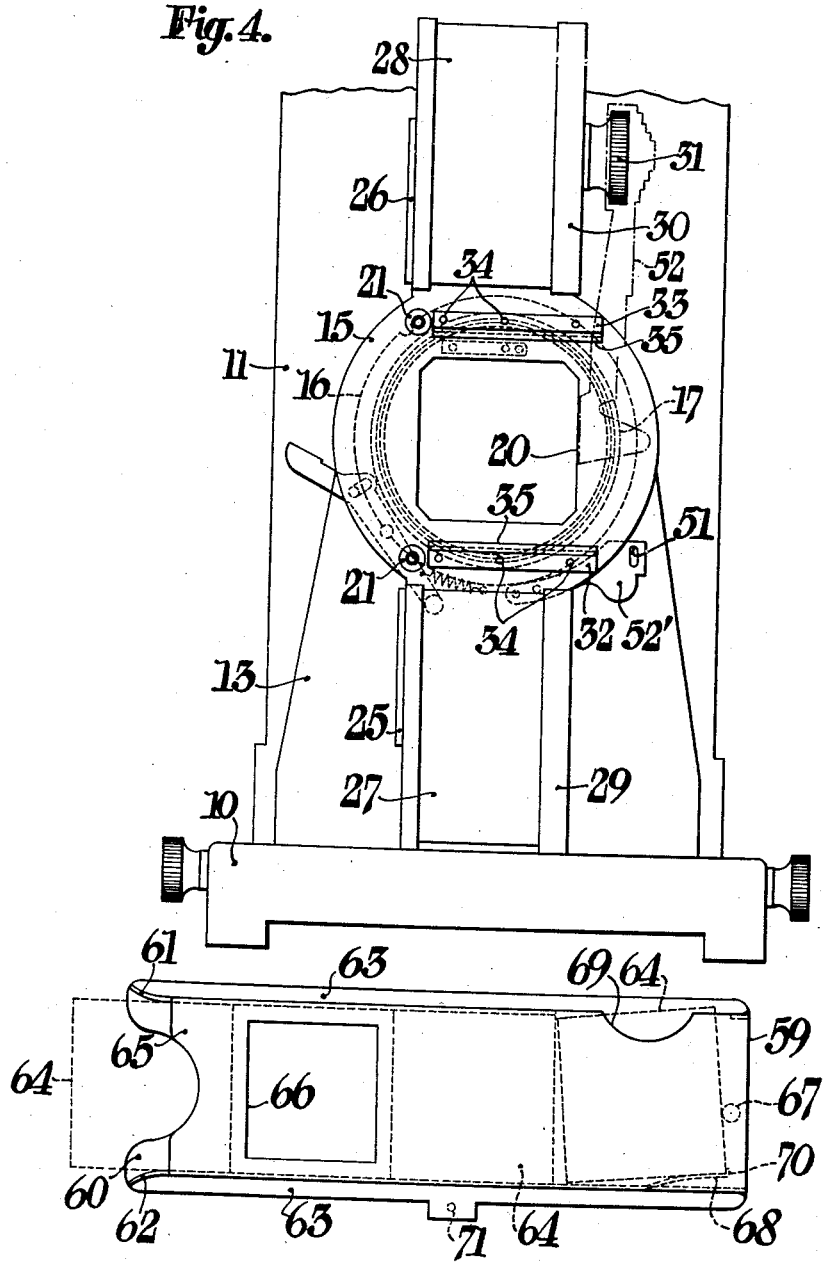

Patented Sept. 5, 1939

2,172,256

UNITED STATES PATENT OFFICE 2,172,256

PROJECTION APPARATUS

August Nagel, Stuttgart, Germany, assignor to Eastman Kodak Company, Rochester, N. Y., a corporation of New Jersey Application May 13, 1937, Serial No. 142,414 In Germany June 26, 1936

12 Claims. (Cl. 88—28)

This invention relates to photography, and particularly to a projection apparatus which is adapted to handle transparencies whether they are in strip form or in the form of slides.

One object of the present invention is to provide a film projector which is adapted to interchangeably receive a slide holder for handling transparencies in slide form, or a detachable film gate through which a strip of transparencies can be fed and be properly positioned in the focal plane of the objective of the projector. Another object is to provide a special film gate for use in such a projector, said gate being capable of alternately gripping and holding the film strip in the focal plane of the objective, and releasing the film strip while the same is being advanced so as to prevent scratching thereof. And still a further object of the invention is to provide a spooling means for advancing a film strip through the projection beam of the projector behind the objective. And yet another object is to provide a means on the projector for alternately opening and closing the film gate, said means being associated with the spooling means whereby the film strip cannot be advanced without first insuring an opening of the film gate. And still another object is to provide an operating member for the film gate, which is adapted to extend into the field of the objective when the gate is in its open position so as to indicate when the film strip is not being held in the focal plane of the objective. Another object is to provide a special slide holder for handling transparencies in slide form, said slide holder being interchangeably mounted on the projector with the film gate.

Briefly, my invention comprises a still projector which is provided with guiding means for interchangeably receiving a slide holder, or a film gate through which a strip of transparencies can be moved by a spooling means. The film gate is adapted to alternately hold the film strip flat in the focal plane of the objective for projection purposes, or to release the same prior to its advancement by the spooling means. The operating member for actuating the film gate is associated with the spooling means so that the film strip cannot be advanced through the film gate without first releasing the gate from its film holding position.

Figure 2:
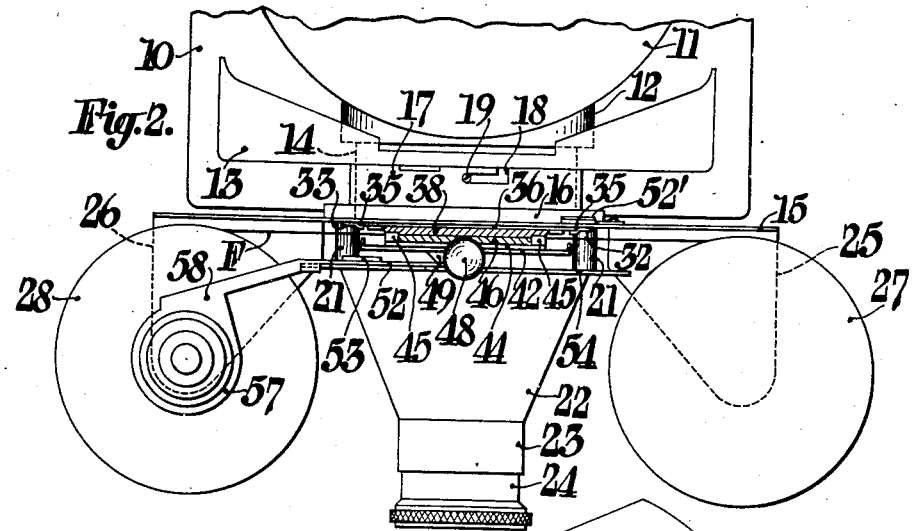
Figure 3:
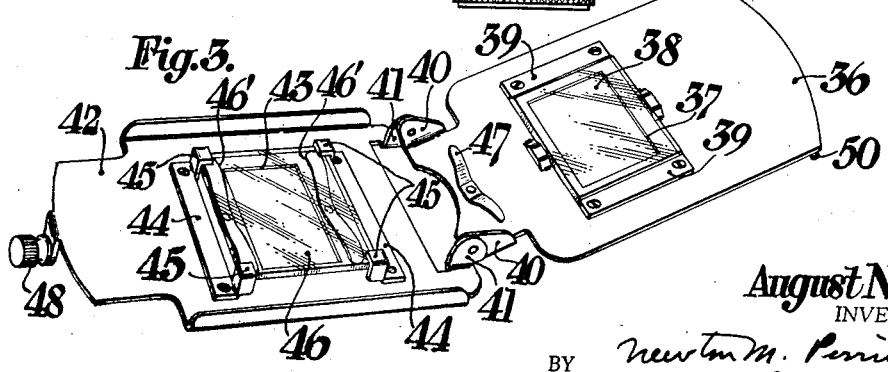

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

Fig. 1 is a partial front elevation of the projector, and showing the film gate in position thereon, and in film releasing condition, Fig. 2 is a partial top plan view of the projector showing the film gate in position thereon, and in film engaging condition, Fig. 3 is a perspective view of the film gate, Fig. 4 is a front elevation of the projector with certain parts indicated in dotted lines for the purpose of clarity, and showing the film gate removed and the objective support rotated to its vertical position for receiving the slide holder, and, Fig. 5 is a front elevation of one type of slide holder which is interchangeable on the projector with the film gate for adapting the projector to the use of transparencies in slide form.

Like reference characters refer to corresponding parts throughout the drawings.

Referring now to the drawings, the projector comprises a base 10 on which is mounted an illuminator 11 having a projection opening 12 in the wall thereof through which the projection beam from a lamp, not shown, mounted inside of the illuminator may pass. The pillar 13 is fixed to the base 10 immediately in front of the illuminator 11, and has an opening, not shown, which is in alignment with the projection openings 12 and in which is fixed the usual condenser system 14 so that said condenser system extends into the projection opening 12. It is to be understood that the condenser system 14 could be supported in the projection opening 12 directly by the illuminator 11 without going beyond the scope of my invention, but since, as will be hereinafter described, the condenser system supports a considerable amount of weight, it has been found desirable to provide a separate support therefor, such as pillar 13.

The support 15 has a ring 16 fixed to the rear side thereof in which is rotatably mounted a collar 17. The collar 17 has a bayonet slot 18 in the periphery thereof which engages a pin 19 on the condenser system 14 whereby the support 15 is mounted on the illuminator 11 to be rotatable with respect thereto for the purpose hereinafter described. The support 15 is provided with an aperture 20 which is in alignment with the projection opening 12 so that the projection beam from the illuminator will pass therethrough. Fixed to and spaced from the support 15 by the studs 21 is a funnel-shaped tunnel 22, the throat 23 of which is internally screw threaded to receive and support the objective 24 in alignment with the aperture 20 in the support 15. The objective 24 is spaced from the support 15 a sufficient distance so that the focal plane of the objective lies slightly in front of the support, and the objective is adjustable relative to the support for focusing purposes.

The support 15 is provided on either end with platforms 25 and 26 to which are fixedly mounted containers 27 and 28 respectively in horizontal alignment with the objective 24. The container 27 has a removable lid 29 which can be removed for the purpose of placing a supply spool of film therein so that it is freely rotatable. The film strip F is led from the container 27 through the projection beam between the support 15 and the objective 24 onto a takeup spool, not shown, which can be rotatably mounted in the container 28 in any suitable manner. Inasmuch as the method of mounting the supply and takeup film spool in the containers 27 and 28 respectively can be accomplished in any suitable manner and form no part of the present invention; it is not deemed necessary to show in the drawings the method described. The lid 30 on the container 28 is provided with a winding knob 31 which is rotatable with respect thereto, and on the end of which may be a suitable clutch connection, not shown, for engaging and assuming control of the takeup spool in the container when the lid is placed on the container for the purpose of manually advancing the film strip F through the projection beam from the supply spool in container 27.

A pair of guide members 32 and 33 are fixedly mounted to the support 15 on either side of the aperture 20 by screws or rivets 34, and the edges 35 thereof are offset with respect to the support 15 so as to provide guideways for detachably mounting a film gate or a slide holder on the support in proper relation with the objective 24 as will be hereinafter described.

Referring now to Fig. 3, the film gate which is detachably mounted on the support 15 for properly positioning strip film in the focal plane of the objective, comprises a rear platen member 36 which is of a size to slip into the guide members 32 and 33 for positioning the film strip on the support, see Fig. 2. The rear platen member is provided with an aperture 37 in covering relation with which is held a glass plate 38 by strips 39. The lower end of the rear platen member 36 has a pair of ears 40 extending perpendicularly therefrom, and to which similar ears 41 on the lower end of the front platen member 42 are hingedly mounted. It will be understood that by virtue of the fact that the ears 41 and 42 extend perpendicularly from the platen members 36 and 42 respectively, the point of hinging between the platen members is in a plane which is parallel to but spaced from each platen member whereby the two members can be rotated toward one another into a parallel but spaced relation.

The front platen member 42 is provided with an aperture 43 which is the same size as aperture 37 in the rear platen member and which is so located therein that it is adapted to be brought into alignment with aperture 37 when the platens are rotated into a parallel relation with respect to one another. On the face of the front platen 42 and located at the top and bottom of the aperture 43 therein are fixed strips 44 the ends of which form angular corner guides 45 which locate the glass plate 46 in covering relations with the aperture 43, but permit it to move a limited distance perpendicular to the plane of front platen 42. A pair of springs 46' are mounted on the face of the front platen member engaging the upper and lower edges of the aperture therein, and engage the glass plate to normally hold it in a plane parallel to the front platen and against the ends of the corner guides 45. This resilient mounting is provided for the glass plate 46 so that when the platens are moved together, instead of the lower edges of the two plates 38 and 46 coming together first and binding, the lower edge of the resiliently mounted platen will give and a uniform surface contact between the glass plates will result when the platens reach their final positions wherein they are parallel. A spring member 47 fastened to the inside face of the rear platen member 36 engages the inside face of the front platen member 42 when the two are rotated toward one another to normally hold them in separated positions. The film gate is readily withdrawn from or inserted into position on the support 15 by gripping the finger-piece 48 fixed to the upper edge of the front platen 42. The outside face of the front platen member is provided with a cam faced projection 49 for the purpose hereinafter described.

When it is desired to project transparencies which are in strip form, the film gate is first positioned on the support 15 by inserting the rear platen member 36 into the guide members 32 and 33, see Fig. 2, whereby the rear platen member 36 becomes a stationary member and the front platen member 42 is movable relative thereto, but is normally held separated therefrom by virtue of the spring 47. The film gate is slid into the guide members 32 and 33 until a pin 50 projecting from the rear face of the rear platen 37 thereof engages a slot 51 in the spring finger 52' which is mounted on the rear side of the support 15 adjacent to guide member 33 thereon. In this position the film gate is positively positioned on the support 15 so that the aperture 37 in the rear platen is aligned with the aperture 20 in the support 15 and the front face of the glass plate 38 is in the focal plane of the objective 24. The strip F is then fed from the container 27 through the open film gate between the glass plates 38 and 46 and to the takeup spool container 28. The drag in the supply spool when the takeup spool is rotated by means of the winding knob 31 will keep the film strip F under tension between the spools so that it will be normally supported in the projection beam without the benefit of the film gate when the latter is in the open position. After the film strip has been advanced so that a given picture frame is framed with the apertures 20 and 37 in the support 15 and the rear platen 36, the double ended lever 52 which is pivoted at 53 to a flange 54 on the tunnel 22 is rotated to its operative position, see Fig. 2. In this position of the lever 52, a notched portion 55 of the end 56 thereof is adapted to engage the cam faced projection 49 on the front platen member 42 and rotate the front platen member toward the rear platen member 36 so that the film strip F is held flat in the focal plane of the objective 24 between the glass plates 38 and 46, see Fig. 2. When the lever 52 is in its gate closing or operative position, a cap member 57 fixed to the end 58 of the lever is adapted to cover the winding knob 31 whereby it is impossible to advance the film strip F through the gate before said gate is moved to its open position. In order to advance the film strip F, the cap 57 must first be removed from the winding knob 31, and in so moving the cap, the end 56 of the lever 52 is removed from engagement with the cam faced projection 49 on the front platen member 42 allowing the same to move to a separated position relative to the rear platen member 36 under the action of the spring 47, see Fig. 1. From the above description it will be readily understood that the lever 52 functions in such a way that an advancement of the film strip cannot be made until the film gate has been opened to release the film strip held therebetween, thereby eliminating any chance of injuring the film strip as would occur if an advancement thereof were attempted while the film was being held by the film gate. When the lever 52 is in its inoperative position, the end 56 thereof projects into the field of the objective 24, and serves as a warning to the operator when the film strip is not held in the focal plane of the objective so that he won't attempt to focus the objective to the film when it is not in the focal plane thereof, see Fig. 1.

If it is desired to project transparencies in slide form instead of strip form, the film gate is removed from the guide members 32 and 33 on the support 15, and is replaced by a slide holder similar to the one shown in Fig. 5 and indicated broadly as 59. The slide holder comprises a rear plate 60 which is of a size to slip into the guide members 32 and 33 on the support 15. A pair of rails 61 and 62 are mounted on the face of the rear plate 60 and are spaced from the edges thereof a sufficient distance to leave runners 63 for engaging the guide members 32 and 33 on the support 15; and are spaced from each other to receive and guide a transparency 64 in slide form. A cover plate 65 is arranged to extend across the rails 61 and 62 and be spaced from the rear platen 60 thereby to permit the transparency 64 to be passed between the plates 60 and 65. The rear plate 60 and the cover plate 65 are provided with aligned apertures, indicated at 66, through which the projection beam is adapted to pass when the slide holder is mounted on the support 15. As indicated in Fig. 5, the transparencies 64 may be fed into the open end of the slide holder 59 one behind the other whereby any one transparency is pushed therethrough by pressure applied to the transparency following. A stop pin 67 projecting from the rear plate 60 extends into the path of the transparencies to limit the movement thereof, and is so located with respect to the aligned apertures 66 that a transparency stopped thereby automatically positions a following transparency in framing relation with respect to the apertures 66. A spring 68 fastened at one end to the inside face of the rail 62 projects into the path of the transparencies, and serves to eject the one previously projected through a break in the rail 61 adjacent which there is a cutout portion 69 in the cover plate 65 whereby the transparencies can be gripped by the fingers and removed from the slide holder. The free end of the spring 68 is turned up as shown at 70, to engage the lower corner of the projected transparency and aid stop pin 67 in limiting the travel of the transparencies in the slide holder.

In Fig. 4, the projection apparatus is shown with the film gate removed from the support 15 to permit the slide holder 59 to be mounted thereon, and the support is shown in its vertical position; it being assumed that the transparencies to be projected have the pictures thereon in horizontal position. Slide holder 59 is mounted on a support 15 by sliding the runners 63 thereof into the guide members 32 and 33. The slide holder 59 is properly mounted on the support with the apertures 66 therein aligned with the aperture 20 in the support 15 when the pin 71 projecting rearwardly from the rear plate 60 snaps into the slot 51 in the spring finger 52'.

Having thus described my invention, what I declare is new and desire to secure by Letters Patent of the United States is:

1. A projection apparatus comprising an illuminator provided with a projection opening, an objective, a support for supporting said objective in alignment with said projection opening, spooling means on said support and for supporting a film strip between said objective and said illuminator, guide members on said support, locating means on said support adjacent said guide members, a film gate for detachable connection with said guide members and for engaging a film strip to hold it in the focal plane of the objective opposite said projection opening, said film gate being removable only when there is no film strip opposite said objective, locating members on said film gate and for positively engaging said locating means on the support to position the film gate in alignment with the projection opening, and an apertured slide holder for detachable connection with said guide members for holding transparent slides opposite said projection opening and movable into position only after said film gate has been removed, said slide holder having locating members thereon for positively engaging the locating means on the support to position the slide holder in the guide members whereby the aperture therein is in alignment with the projection opening.

2. A projection apparatus comprising an illuminator provided with a projection opening, an objective, a support for supporting said objective in alignment with said projection opening, spooling means on said support and for supporting a film strip between said objective and said illuminator, guide members on said support, an apertured spring finger mounted on said support adjacent said guide members, a film gate for detachable connection with said guide members and for engaging a film strip to hold it in the focal plane of the objective opposite said projection opening, said film gate being removable only when there is no film strip opposite said objective, a pin on said film gate adapted to snap into the aperture in the spring finger when the film gate is positioned in the guide members for locating the film gate in alignment with the projection opening, and an apertured slide holder for detachable connection with said guide members for holding transparent slides opposite said projection opening and movable into position only after said film gate has been removed, said slide holder having a pin fixed thereto and adapted to snap into the aperture in the spring finger for positioning the slide holder in the guide members whereby the aperture therein is in alignment with the projection opening.

3. A projection apparatus comprising an illuminator provided with a projection opening, an objective, a support for supporting said objective in alignment with the projection opening, spooling means on said support and for supporting and moving a film strip between the objective and the projection opening, a film gate located on said support in the path of the film strip, and for alternately holding the film strip in the focal plane of the objective and releasing the film strip prior to its advancement by the spooling means, said film gate including a stationary platen in the focal plane of the objective, and a second platen hinged thereto to move into and out of surface contact therewith, resilient means normally holding the second platen removed from stationary platen, and means for moving the movable platen into contact with the stationary platen against the resilient means, said means including an arm pivotally mounted on the support, one end of said arm being adapted to engage the movable platen and move it against the resilient means, the other end of the arm being adapted to obstruct the operation of the spooling means when the arm is in its operative position whereby the film strip cannot be advanced through the film gate while the platens are in their holding positions.

4. In a projection apparatus the combination with an illuminator provided with a projection opening, an objective, a support for supporting said objective in alignment with said projection opening, spooling means on said support and for supporting a film strip between said objective and said illuminator, an operating member for operating said spooling means to advance the film past said objective, guide members on said support, of a film gate for detachable connection with said guide members and for optionally engaging and holding the film strip flat in the focal plane of the objective, said film gate comprising a stationary member adapted to detachably engage the guide members on the support to locate the film gate thereon in the focal plane of the objective, a movable member hinged to the stationary member and movable into surface contact therewith for holding the film strip therebetween in the focal plane of the objective, and means for moving said movable member into and out of film holding position relative to said stationary member, said means including a part adapted to prevent access to said operating member when said movable member is in its film holding position, and adapted to permit access to said operating member when said movable member is moved from its film holding position, whereby the film strip cannot be advanced through the film gate until the movable platen is removed from the stationary platen.

5. In a projection apparatus the combination with an illuminator provided with a projection opening, an objective, a support for supporting said objective in alignment with said projection opening, spooling means on said support for supporting the film strip between said objective and said illuminator, a winding member for operating said spooling means to move the film past said objective, guide members on said support, of a film gate for detachable connection with said guide members and for optionally engaging and holding the film strip flat in the focal plane of the objective, said film gate comprising a stationary member adapted to detachably engage the guide members on the support for locating the same in the focal plane of the objective, a movable member hinged at one end to the stationary member and movable into surface contact therewith for holding the film strip flat therebetween in the focal plane of the objective, resilient means between the stationary and movable members for normally holding them in separated positions, and means for moving said movable member into film holding position relative to the stationary member against the action of the resilient means, said means including a cap adapted to cover said winding member when said movable member is in its film holding position, whereby the film strip cannot be advanced through the gate while the movable member is held in its holding position by means of the action of the resilient means.

6. In a projection apparatus the combination with an illuminator provided with a projection opening, an objective, a support for supporting said objective in alignment with said projection opening, spooling means on said support for supporting the film strip between said objective and said illuminator, guide members on said support, of a film gate for detachable connection with said guide members and for optionally engaging and holding the film strip flat in the focal plane of the objective, said film gate comprising a stationary member adapted to engage the guide members on the support for locating the same in the focal plane of the objective, a movable member hinged at one end to the stationary member and movable into surface contact therewith for holding the film strip flat therebetween in the focal plane of the objective, a spring between the stationary and movable members for normally holding them in separated positions, and means for moving said movable member into film holding position relative to the stationary member against the action of the spring, said means including a double ended lever pivotally mounted on the support, one end of the lever in the operative position thereof adapted to engage and press the movable member into film holding position against the action of the spring, the other end of the lever being adapted to obstruct the spooling means whereby the film cannot be advanced through the gate while the movable member is in its film holding position.

7. In a projection apparatus the combination with an illuminator provided with a projection opening, an objective, a support for supporting said objective in alignment with said projection opening, spooling means on said support and for supporting and advancing a film strip between said objective and said illuminator, said spooling means including a supply spindle mounted on the support at one side of and in horizontal alignment with the objective, a supply reel of film mounted thereon, a takeup spindle mounted on the support on the other side of and in alignment with the objective, a takeup reel rotatably mounted thereon, a winding key connected with said takeup reel for rotating the same and moving the film strip between the projection opening and the objective, guide members on said support, of a film gate for detachable connection with said guide members in the path of the film strip and for optionally engaging and holding the film strip flat in the focal plane of the objective, said film gate comprising a stationary member adapted to engage the guide members on the support for locating the same in the focal plane of the objective, a movable member hinged at one end to the stationary member and movable into surface contact therewith for holding the film strip flat therebetween, a spring fixed to the stationary member and engaging the movable member to normally hold them separated, and means for moving said movable member into film holding position relative to the stationary member against the action of the spring, said means comprising a double ended lever pivotally mounted to the support, one end of said lever adapted in the operative position of the lever to engage and press the movable gate member into contact with the stationary member to hold the film strip in the focal plane of the objective, the other end of the lever constituting a cap which is adapted to cover the winding key when the lever is in its operative position whereby the film strip cannot be advanced through the gate until the movable gate member is released from its film holding position.

8. In a projection apparatus the combination with an illuminator provided with a projection opening, an objective, a support for supporting said objective in alignment with said projection opening, spooling means on said support and for supporting and advancing a film strip between said objective and said illuminator, said spooling means including a supply spindle mounted on the support at one side of and in horizontal alignment with the objective, a supply reel of film mounted thereon, a takeup spindle mounted on the support on the other side of and in alignment with the objective, a takeup reel rotatably mounted thereon, a winding key connected with said takeup reel for rotating the same and moving the film strip between the projection opening and the objective, guide members on said support, of a film gate for detachable connection with said guide members in the path of the film strip and for optionally engaging and holding the film strip flat in the focal plane of the objective, said film gate comprising a stationary member adapted to engage the guide members on the support for locating the same in the focal plane of the objective, a movable member hinged at one end to the stationary member and movable into surface contact therewith for holding the film strip flat therebetween, a spring fixed to the stationary member and engaging the movable member to normally hold them separated, a cam faced projection on the movable member and located adjacent the free end thereof, and means for moving said movable member into film holding position relative to the stationary member against the action of the spring, said means comprising a double ended lever pivotally mounted to the support, one end of said lever in the operative position of the lever adapted to engage the cam faced projection to move the movable gate member into its film holding position relative to the stationary member, and a cap on the other end of said lever adapted in the operative position of the lever to cover the winding key whereby the film cannot be advanced while the movable member is in its film holding position.

9. In a projection apparatus the combination with an illuminator provided with a projection opening, an objective, a support for supporting said objective in alignment with said projection opening, spooling means on said support and for supporting and advancing a film strip between said objective and said illuminator, said spooling means including a supply spindle mounted on the support at one side of and in horizontal alignment with the objective, a supply reel of film mounted thereon, a takeup spindle mounted on the support on the other side of and in alignment with the objective, a takeup reel rotatably mounted thereon, a winding key connected with said takeup reel for rotating the same and moving the film strip between the projection opening and the objective, guide members on said support, of a film gate for detachable connection with said guide members in the path of the film strip and for optionally engaging and holding the film strip flat in the focal plane of the objective, said film gate comprising a stationary member adapted to engage the guide members on the support for locating the same in the focal plane of the objective, a movable member hinged at one end to the stationary member and movable into surface contact therewith for holding the film strip flat therebetween, a spring fixed to the stationary member and engaging the movable member to normally hold them separated, and means for moving the movable member into a film holding position relative to the stationary member against the action of the spring, said means comprising a double ended lever pivotally mounted on the support to move between an operative and an inoperative position, one end of the lever in the operative position thereof adapted to engage and press the movable member into film holding position relative to the stationary member, while the other end of said lever constituting a cap covers the winding key to prevent the operation thereof while the movable member is in film holding position, and in the inoperative position of the lever one end thereof adapted to extend into the field of the objective to provide a warning against projection when the film strip is not held in the focal plane of the objective.

10. A detachable film gate for a projection apparatus comprising an apertured rear platen member the edges of which serve as guide members, a glass plate fixed to said rear platen member in covering relation with the aperture therein, and a front platen member hinged at its lower end to the rear platen member to rotate relative thereto, said front platen member having an aperture which is adapted to be brought into alignment with the aperture in the rear platen member when one is rotated upon the other, a glass plate mounted on said front platen member in covering relation with the aperture therein to move to and from said platen member in a plane substantially parallel thereto, resilient means normally moving said glass plate away from said platen member for insuring a uniform surface contact over the entire surface of the glass plate on the rear platen member when the two are brought together whereby a film strip therebetween will be held in a flat condition, and a spring fixed to the inner face of the rear platen member for normally holding the two platen members and the glass plates thereon in a separated and film releasing position.

11. A detachable film gate for a projection apparatus comprising an apertured rear platen member the edges of which serve as guide members, a glass plate fixed to said rear platen member in covering relation with the aperture therein, a front platen member rotatably hinged at its lower end to the lower end of the rear platen member, the point of hinging being in a plane offset but parallel to the two platen members whereby they can be rotated one upon the other into parallel relation, said front platen member provided with an aperture which is adapted to be brought into alignment with the apertures in the rear platen member when the two are rotated into parallel relation, angular guide members mounted on the front platen at the four corners of the aperture therein, a glass plate movably mounted in said angular guide members in covering relation with the aperture in the front platen, and adapted to engage the glass plate on the rear platen member to hold a film strip therebetween when the two platen members are rotated into parallel relation, and springs between the front platen member and the glass plate thereon for insuring uniform contact over the entire engaging surfaces of the two platens when the two are moved in film holding position, and a spring between the two platen members for normally holding them in a separated or film releasing position.

12. A slide holder for a projection apparatus comprising an apertured base plate the edges of which serve as guide members, a pair of spaced guide rails on the face of the base plate and extending the length thereof, said guide rails being situated on opposite sides of the aperture in the base plate and being adapted to receive and confine a plurality of individual transparencies in sliding relation on the base plate, a cover plate connecting said guide rails and being spaced from the base plate thereby to permit of the individual transparencies being slid therebetween in follow up relation, said cover plate being provided with an aperture in alignment with the aperture in the base plate, a stop projecting from the base plate into the path formed by said guide rails, said stop being so located relative to the aperture in the base plate that a transparency stopped thereby automatically frames one of the subsequent transparencies with the aperture in the base plate, and a spring finger fixed to one of the rail members and projecting into the path of the transparencies adjacent the stop member, said spring finger adapted to eject the last transparency transversely of the base plate and through an opening in the opposite guide rail adjacent which there is a finger groove in the cover plate whereby the transparency can be gripped by the fingers and be removed from the slide holder.

AUGUST NAGEL.